United States Patent
Seen et al.

(10) Patent No.: US 9,829,733 B2
(45) Date of Patent: Nov. 28, 2017

(54) MOBILE TERMINAL

(71) Applicant: LG Electronics Inc., Seoul (KR)

(72) Inventors: Seungmin Seen, Seoul (KR); Sangjo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/799,377

(22) Filed: Jul. 14, 2015

(65) Prior Publication Data
US 2016/0202726 A1    Jul. 14, 2016

(30) Foreign Application Priority Data

Jan. 14, 2015 (KR) .................. 10-2015-0006931

(51) Int. Cl.
*G02F 1/1335* (2006.01)
*G02F 1/1337* (2006.01)
(Continued)

(52) U.S. Cl.
CPC ....... *G02F 1/133308* (2013.01); *G02B 6/009* (2013.01); *G02B 6/0025* (2013.01);
(Continued)

(58) Field of Classification Search
CPC ........... G02F 1/133753; G02F 1/13394; G02F 1/133305; G02F 1/133504; G02F 1/133509; G02F 1/133512; G02F 2001/133317; G02F 2001/133331; G02F 2001/133507; G02F 2001/133757; G02F 2001/13396;
(Continued)

(56) References Cited

U.S. PATENT DOCUMENTS 7,244,966 B2 * 7/2007 Fukayama ........ G02F 1/133308
257/98
2001/0006461 A1 7/2001 Okuno
(Continued)

FOREIGN PATENT DOCUMENTS

EP    2 650 720 A1    10/2013
EP    2 899 951 A1    7/2015
(Continued)

*Primary Examiner* — Michael Caley
*Assistant Examiner* — Angela Davison
(74) *Attorney, Agent, or Firm* — Birch, Stewart, Kolasch & Birch, LLP

(57) ABSTRACT

A mobile terminal disclosed herein includes a window on one surface of a terminal body and configured to be curved, and a liquid crystal display (LCD) on a rear surface of the window to output visual information, and curved by external force. The liquid crystal display includes a liquid crystal panel to generate an image using light from a light guide plate, at least one prism sheet disposed between the light guide plate and the liquid crystal panel, and a supporting member accommodating the light guide plate and the prism sheet and supporting the liquid crystal panel. The supporting member includes first and second mounting portions with the liquid crystal panel mounted. At least one of the first and second mounting portions has a recess portion for insertion of an edge of the prism sheet to prevent shifting of the prism sheet due to the liquid crystal display being curved.

19 Claims, 12 Drawing Sheets

(51) Int. Cl.

| | |
|---|---|
| *G02F 1/1333* | (2006.01) |
| *G02F 1/1339* | (2006.01) |
| *G06F 1/16* | (2006.01) |
| *F21V 8/00* | (2006.01) |
| *G02F 1/1368* | (2006.01) |
| *H04M 1/02* | (2006.01) |
| *H04N 5/64* | (2006.01) |
| *B32B 38/18* | (2006.01) |

(52) U.S. Cl.
CPC .......... *G02B 6/0051* (2013.01); *G02B 6/0053* (2013.01); *G02B 6/0088* (2013.01); *G02F 1/1368* (2013.01); *G02F 1/13394* (2013.01); *G02F 1/133514* (2013.01); *G02F 1/133753* (2013.01); *G06F 1/1637* (2013.01); *H04M 1/0268* (2013.01); *B32B 38/1866* (2013.01); *B32B 2457/202* (2013.01); *B32B 2457/206* (2013.01); *G02F 1/133305* (2013.01); *G02F 1/133504* (2013.01); *G02F 2001/13396* (2013.01); *G02F 2001/13398* (2013.01); *G02F 2001/133317* (2013.01); *G02F 2001/133331* (2013.01); *G02F 2001/133507* (2013.01); *G02F 2001/133757* (2013.01); *G02F 2201/56* (2013.01); *G02F 2202/28* (2013.01); *G06F 1/1652* (2013.01); *G09G 2380/02* (2013.01); *H04N 5/64* (2013.01)

(58) Field of Classification Search
CPC .......... G02F 2001/13398; G02F 2001/133368; G02F 2001/133773; G02F 2201/56; G02F 1/133502; G02B 6/0025; G02B 6/0051; G02B 6/0053; G02B 6/0088; G02B 6/009; G02B 6/005; G06F 1/1652; G09G 2380/02

USPC ..................... 349/64, 58, 110, 160, 155, 128
See application file for complete search history.

(56) References Cited

U.S. PATENT DOCUMENTS

| | | | |
|---|---|---|---|
| 2009/0015747 A1* | 1/2009 | Nishizawa | ........ G02F 1/133308 349/58 |
| 2009/0147174 A1 | 6/2009 | Ha et al. | |
| 2010/0165235 A1 | 7/2010 | Lee et al. | |
| 2010/0328580 A1* | 12/2010 | Kim | ..................... G02B 6/0073 349/64 |
| 2011/0051348 A1 | 3/2011 | Song | |
| 2012/0314168 A1* | 12/2012 | Kang | ................ G02F 1/133723 349/124 |
| 2012/0320623 A1 | 12/2012 | Wada | |
| 2013/0027629 A1* | 1/2013 | Kiyohara | .......... G02F 1/133308 349/58 |
| 2013/0329150 A1* | 12/2013 | Kim | ................... G02F 1/13338 349/42 |
| 2014/0111974 A1 | 4/2014 | Choi et al. | |
| 2014/0146272 A1* | 5/2014 | Shin | ................. G02F 1/133308 349/65 |

FOREIGN PATENT DOCUMENTS

| | | |
|---|---|---|
| JP | 2009-20168 A | 1/2009 |
| KR | 10-2009-0060043 A | 6/2009 |
| KR | 10-2011-0032319 A | 3/2011 |
| KR | 10-2014-0072287 A | 6/2014 |

\* cited by examiner

MOBILE TERMINAL

CROSS-REFERENCE TO RELATED APPLICATION

Pursuant to 35 U.S.C. §119(a), this application claims the benefit of earlier filing date and right of priority to Korean Application No. 10-2015-0006931, filed on Jan. 14, 2015, the contents of which is incorporated by reference herein in its entirety.

BACKGROUND OF THE DISCLOSURE

1. Field of the Disclosure

This specification relates to a mobile terminal with a display unit in a curved shape.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

Mobile terminals (or electronic devices) may be configured to perform various functions, for example, data and voice communication, capturing images or video, storing voice, reproducing music files via a speaker system, displaying images or video and the like. Some mobile terminals may include an additional function of playing electronic games, and other mobile terminals may be implemented as multimedia players. In addition, recently, mobile terminals can receive multicast signals to allow viewing of visual contents, such as broadcasting, video or television programs.

As it becomes multifunctional, a mobile terminal can be allowed to capture still images or moving images, play music or video files, play games, receive broadcast and the like, so as to be implemented as an integrated multimedia player.

Furthermore, many efforts are undergoing to support or enhance various functions of such mobile terminals. Such many efforts include changes and improvement of structural components implementing a mobile terminal and/or software or hardware improvement.

In view of the improvements of the structural components, mobile terminals are evolving into various design shapes. Accordingly, a mobile terminal with a display unit in a curved shape is attracting attention. In response to such attention to the curved display unit, active researches on a device structure focusing on the curved display unit are ongoing.

SUMMARY OF THE DISCLOSURE

Therefore, an aspect of the detailed description is to provide a structure capable of implementing the conventional flat display into a curved display.

Another aspect of the detailed description is to provide a novel structure for ensuring quality reliability in a curved liquid crystal display (LCD).

To achieve these and other advantages and in accordance with the purpose of this specification, as embodied and broadly described herein, there is provided a mobile terminal including a window disposed on one surface of a terminal main body and configured to be curved, and a liquid crystal display (LCD) disposed on a rear surface of the window and configured to output visual information through the window, the liquid crystal display being curved by an external force. The liquid crystal display may include a liquid crystal panel configured to generate an image using light discharged from a light guide plate, at least one prism sheet disposed between the light guide plate and the liquid crystal panel, and a supporting member configured to accommodate the light guide plate and the prism sheet therein and support the liquid crystal panel. The supporting member may include first and second mounting portions on which the liquid crystal panel is mounted. At least one of the first and second mounting portions may be provided with a recess portion. An edge portion of the prism sheet may be inserted into the recess portion to prevent a shift of the at least one prism sheet due to the liquid crystal display being curved.

In accordance with another embodiment related to the present invention, the first and second mounting portions may be formed on both sides of the supporting member, respectively, and the recess portion may extend in parallel to the both sides.

The recess portion may be formed on only one of the first and second mounting portions. The edge portion of the at least one prism sheet may be entirely formed in a linear shape so as to be fully inserted into the recess portion. At least one of edges of the at least one prism sheet may be inserted into the recess portion.

In accordance with another embodiment related to the present invention, the at least one prism sheet may be one of first and second prism sheets overlaid on each other. The first prism sheet may be provided between the light guide plate and the second prism sheet, and edge portions of the first and second prism sheets may all be inserted into the recess portion.

In accordance with another embodiment related to the present invention, a diffusion sheet for diffusing light discharged from the light guide plate may be disposed between the light guide plate and the prism sheet, and an edge of the diffusion sheet may be inserted into the recess portion.

In accordance with another embodiment related to the present invention, a diffusion sheet for diffusing light discharged from the light guide plate may be disposed between the light guide plate and the prism sheet. A light source of the liquid crystal display may be mounted on a flexible printed circuit board, which is spaced apart from one end portion of the prism sheet in a direction parallel to the both sides of the supporting member. The diffusion sheet and the flexible printed circuit board may be separated from each other.

One end portion of the diffusion sheet may be located between one end portion of the prism sheet and the flexible printed circuit board, to form an exposed portion of the light guide plate between the diffusion sheet and the flexible printed circuit board. The exposed portion may be obscured by a light shielding tape attached onto the supporting member. At least a part of the light shielding tape may overlap the recess portion.

In accordance with another embodiment related to the present invention, the diffusion sheet may be disposed not to overlap the flexible printed circuit board in a thickness direction of the liquid crystal display.

The recess portion may be provided with stopping recesses, and stopping protrusions may be formed on an edge of the diffusion sheet to be stopped in the stopping recesses.

In accordance with another embodiment related to the present invention, the liquid crystal display may include a cover glass covering the liquid crystal panel, and at least a part of the supporting member may be adhered onto the cover glass. Protrusions may protrude from at least one end portion of the supporting member toward the cover glass, and the protrusions and a rear surface of the cover glass may be adhered onto each other.

In accordance with another embodiment related to the present invention, recesses filled with liquid crystal may be provided on the liquid crystal panel. The recesses may include a first recess formed in a first direction, and a second recess formed in a second direction intersecting with the first direction. The second recess may be located on at least one edge portion of the liquid crystal panel.

In accordance with another embodiment related to the present invention, the liquid crystal panel may include a color filter (CF) glass and a thin film transistor (TFT) glass. Spacers which have different deformation degrees due to the external force may be disposed between the color filter glass and the thin film transistor glass. Some of the spacers may be in a pressed state and others thereof may be in an expanded state.

In accordance with the present invention having the configuration, a mounting surface of a mounting portion to which a window is coupled may be formed in a curved shape, such that the window can be changed into the curved shape to correspond to the curved mounting surface when the window is coupled. Therefore, the conventional flat liquid crystal display can be implemented as a curved display unit in a manner of being coupled to a frame, and a curved display unit with various curvatures can be easily realized by adjusting a curvature of the mounting surface.

Also, according to the present invention, because an edge of a prism sheet is inserted into a supporting member, the shift of the prism sheet can be prevented even though the liquid crystal display is curved. Specifically, since the supporting member entirely supports the edge of the prism sheet, a position of the prism sheet which is located far away from a neutral axis can be fixed when the liquid crystal display is curved.

According to the present invention, as a diffusion sheet and a flexible printed circuit board are separated from each other, light leakage which is caused due to a displacement of the diffusion sheet when the liquid crystal display is curved can be prevented.

According to the present invention, since at least a part of the supporting member is adhered on a cover glass, light leakage from a light-emitting unit or a detachment (or loosing) of a light shielding tape can be reduced or prevented.

According to the present invention, since some of recesses filled with liquid crystal are formed at a different angle from others, light leakage due to torsion of a rubbing shaft can be reduced or prevented.

According to the present invention, a cell gap of a liquid crystal panel can be uniformly maintained by setting different deformation degrees for spacers located between a color filter glass and a thin-film transistor glass.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, the present disclosure will be explained in more detail with reference to the attached drawings. For the sake of brief description with reference to the drawings, the same or equivalent components will be provided with the same reference numbers, and description thereof will not be repeated. The terms "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
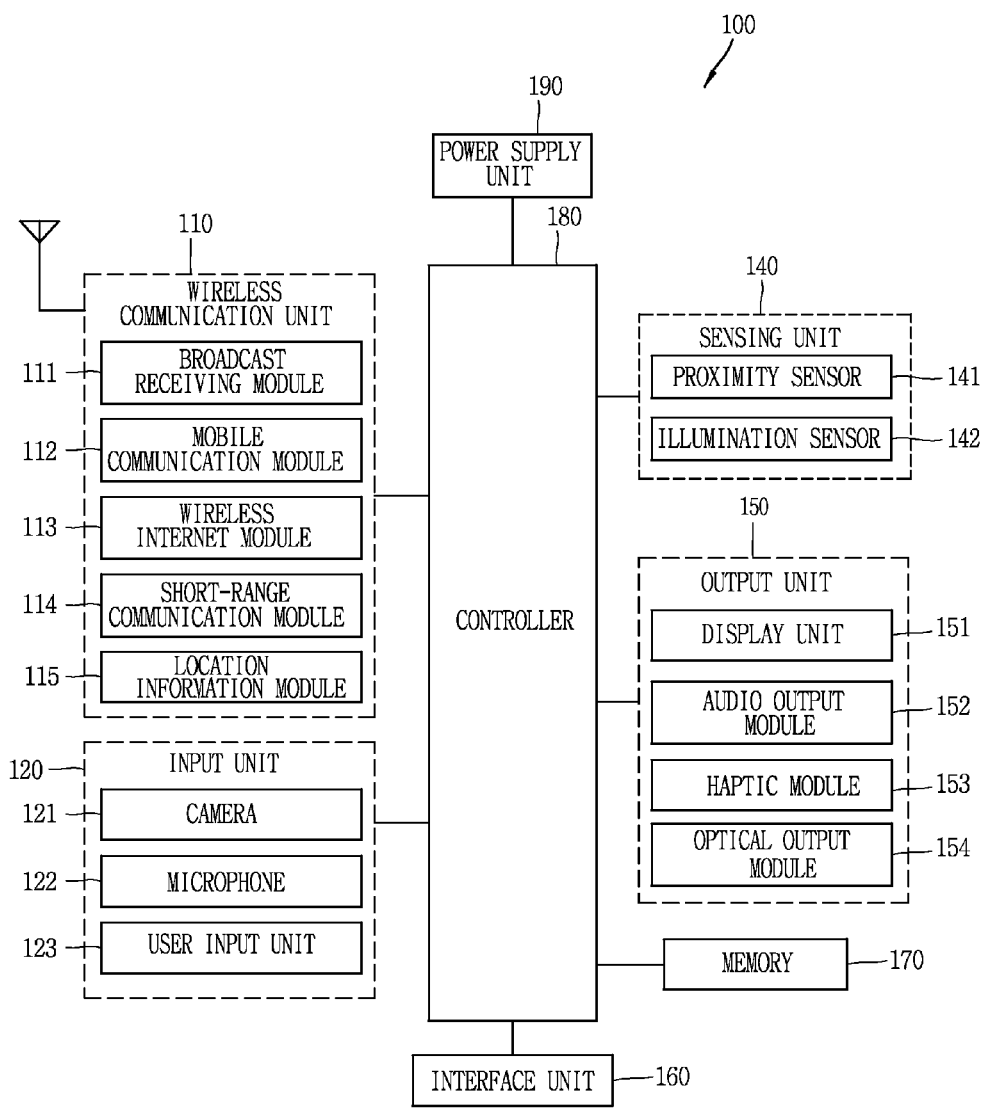
FIG. 1 is a block diagram of a mobile terminal in accordance with one exemplary embodiment of the present disclosure.

FIG. 1 is a block diagram of a mobile terminal 100 in accordance with one exemplary embodiment of the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among those components, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 (or an image input device) for an image signal input, a microphone 122 (or an audio input device) for an audio signal input, and a user input unit 123 (for example, a touch key, a push key, and the like) for allowing a user to input information. Data (for example, audio, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 may be configured to utilize information obtained from the sensing unit 140, and in particular, information obtained from at least two sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or applications) executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operations of the mobile terminal 100, in addition to the operations associated with the application programs. The controller 180 may provide or process information or functions appropriate for a user by processing signals, data, information and the like, or activating application programs stored in the memory 170.

Also, the controller 180 may control some or all of the components illustrated in FIG. 1A according to the execution of an application program that have been stored in the memory 170. In addition, the controller 180 may combine two or more components included in the mobile terminal 100 for operation to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi) Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), and Wi-Fi Direct. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via near field wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 may have a more extended lifespan and higher utilization than the contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has described as the component of the input unit 120, typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
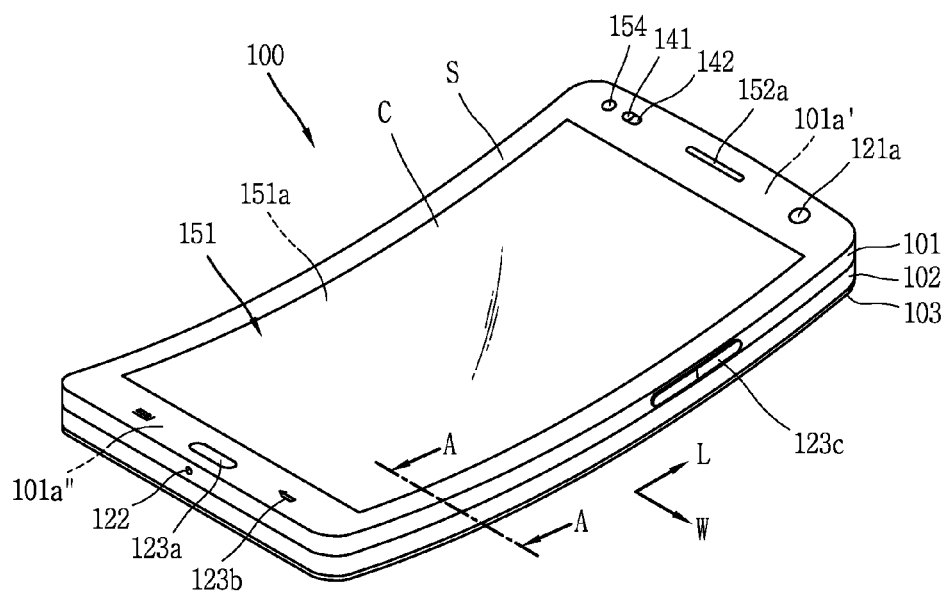
FIGS. 2 and 3 are conceptual views of one example of a mobile terminal, viewed from different directions, in accordance with the present disclosure.
Figure 3:
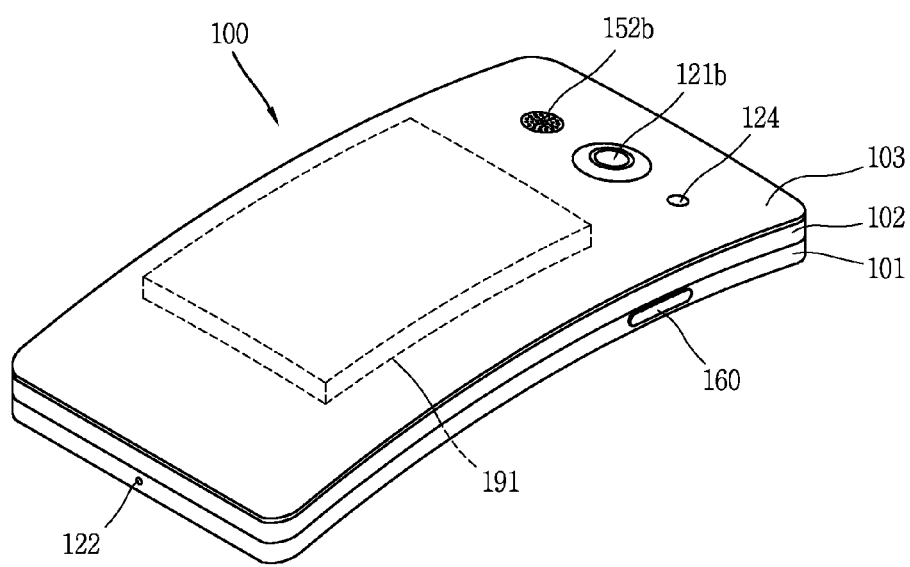

FIGS. 2 and 3 are conceptual views of one example of a mobile terminal, viewed from different directions, in accordance with the present disclosure.

As illustrated in FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, a first manipulation unit 123a, 123b, a second manipulation unit 123c, a microphone 122, an interface unit 160, and the like.

Hereinafter, description will be given, as illustrated in FIGS. 2 and 3, of an exemplary embodiment of a mobile terminal, in which the display unit 151, the first audio output module 152a, the proximity sensor 141, the illumination sensor 142, the optical output module 154, the first camera 121a and the first manipulation units 123a and 123b are disposed on a front surface of a terminal body, the second manipulation unit 123c, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or rearranged. For example, the first manipulation unit 123a, 123b may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a, 123b.

The first audio output module 152a may be implemented in the form of a receiver to transfer voice audio to a user's ear, and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first manipulation unit 123a, 123b and the second manipulation unit 123c are examples of the user input unit 123, which may be manipulated by a user to provide input to the mobile terminal 100. The first and second manipulation units 123a,123b and 123c may also be commonly referred to as a manipulating portion, and may employ any tactile method that allows the user to perform manipulation such as touch, push, scroll, or the like. The first and second manipulation units 123a, 123b and 123c may also employ any non-tactile method that allows the user to perform manipulation such as proximity touch, hovering, or the like.

FIGS. 2 and 3 illustrate the first manipulation unit 123a, 123b as a combination of a mechanical key 123a and a touch key 123b.

Input received at the first manipulation unit 123a, 123b and the second manipulation unit 123c may be used in various ways. For example, the first manipulation unit 123a, 123b may be used by the user to provide an input to a menu, home key, cancel, search, or the like, and the second manipulation unit 123c may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the main body of the terminal, a new type of user interface using the rear input unit can be implemented. Also, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 according to the present disclosure may be formed in a curved shape along one direction of the terminal body, and this type is referred to as a curved display unit 151, hereinafter.

This exemplary embodiment illustrates that the curved display unit 151 is curved along a lengthwise direction L of the terminal body. That is, the curved display unit 151 may have a shape that both end portions thereof adjacent to the first audio output module 152*a* and the microphone 122, respectively, are curved with respect to a central portion of the curved display unit 151. Unlike this, the display unit 151 may also be formed in a shape curved along a widthwise direction W of the terminal body.

In addition to the curved display unit 151 in the curved shape, the mobile terminal 100 may also be formed in the curved shape on the whole.

Hereinafter, a device structure based on the curved display unit 151 will be described in more detail with reference to the accompanying drawings.

Figure 4:
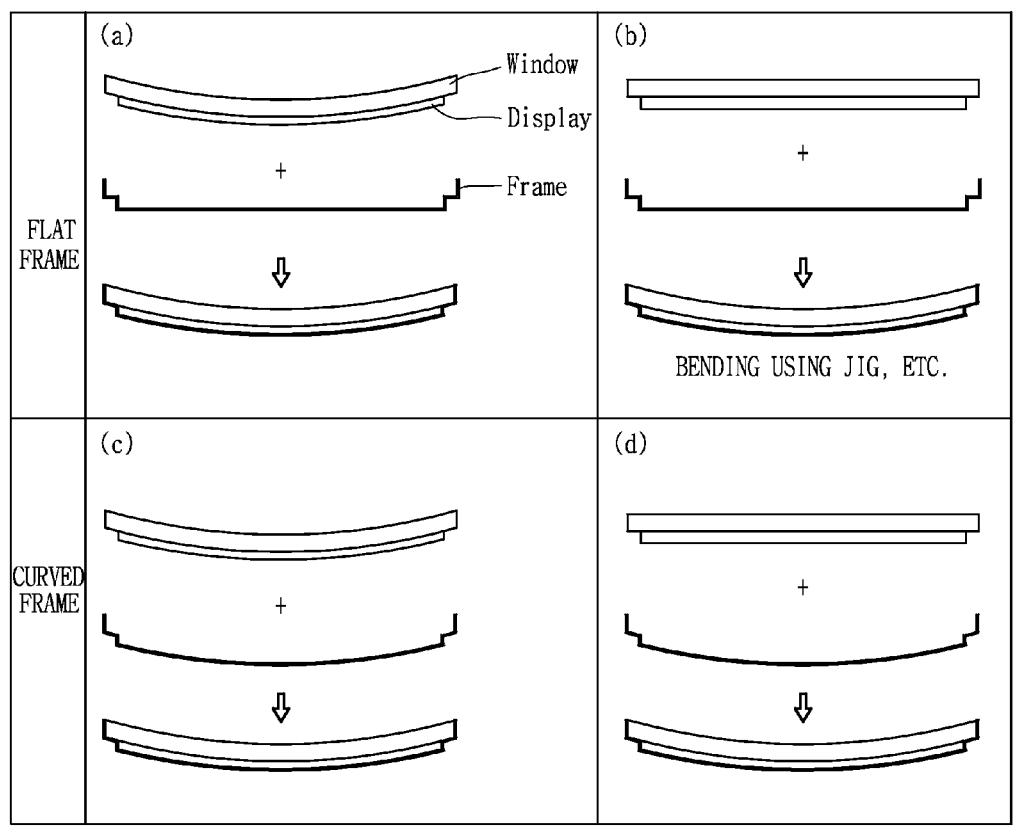
FIG. 4 is a schematic view illustrating concepts for implementing a curved display unit.

FIG. 4 is a schematic view illustrating concepts for implementing a curved display unit.

As illustrated in FIG. 4, a display unit includes a window and a display.

The window is disposed to cover the display, and defines one surface of a terminal main body. The window may be made of a light-transmittable material, for example, light-transmittable synthetic resin, tempered glass, and the like.

The window may include a portion through which light cannot be transmitted. For example, as illustrated in FIG. 2, the window may be divided into a central region C (see FIGS. 2 and 5) and an edge region S (see FIGS. 2 and 5) surrounding the central region C. The central region C may preferably be formed transparent and colorless such that visual information output to the display can be recognized from the outside, and the edge region S may preferably be formed colored and/or opaque such that an internal device structure of the mobile terminal cannot be exposed to the outside.

The window may be fabricated in a curved shape or first fabricated in a flat shape and then changed into a curved shape by a device (i.e., jig) or in a manual manner. That is, the window may be curved when an external force is applied. For example, the window may be curved along one direction of the terminal body. Here, the window may have a preset radius of curvature.

The display may be disposed on the rear surface of the window, and output visual information through the window. The display unit may have an area corresponding to the light-transmittable region of the window, such that the user can recognize the visual information output on the display from the outside.

The display may include a liquid crystal (LC) panel on which an image is output, a backlight unit emitting light toward the LC panel.

The LC panel may include color filter (CF) glass and thin film transistor (TFT) glass, which are spaced apart from each other, a liquid crystal filled between the CF glass and the TFT glass, a polarizer disposed on an upper surface of the CF glass, and another polarizer disposed on a rear surface of the TFT glass.

The backlight unit may include a light source, a light guide plate guiding light emitted from the light source, a reflection film disposed on a rear surface of the light guide plate, and a diffusion film and a prism sheet laminated on the light guide plate.

The display may be interlayered or integrally formed with a touch sensor, to implement a touch screen. The touch screen may provide an input interface as well as an output interface between the mobile terminal and a user.

Between the window and the display may be provided an adhesive layer for adhering them onto each other. The adhesive layer may be made of optical clear adhesive (OCA), optical clear resin (OCR), and the like.

When an external force is applied, the display may be curved. The external force may be a coupling force which is applied when the display is coupled with another member or an external force which is applied by post-processing (for example, processing using the device (i.e., jig) or by the manual operation).

When the display configures the display unit by being coupled to the rear surface of the window, the display unit may have a curved shape by the following methods.

For example, when a display fabricated in a flat shape is coupled to a window which is fabricated in a curved shape or changed into a curved shape through post-processing, the display may be changed into the curved shape in correspondence to the curved shape of the window through the coupling with the window. As another example, a window and a display, which are all formed in a flat shape, may be coupled to each other, and thereafter changed into a curved shape by the device (i.e., jig) or the manual operation, thereby implementing a curved display unit. As still another example, a curved display unit may be implemented by coupling a window and a display each of which is fabricated in a curved shape by the device (i.e., jig) or the manual operation.

The display unit may be coupled to a frame. In detail, the frame may be coupled to the window so as to support the window and accommodate the display. The frame may be fabricated in a curved shape from the beginning or first fabricated in a flat shape and thereafter changed into a curved shape by a device (i.e., jig) or a manual operation. The frame may be curved when an external force is applied thereto.

Combining those configurations, a curved display can be implemented in various manners. Here, during a process of coupling each component, a component having a flat shape may be curved to correspond to a component having a curved shape through the coupling to each other.

For example, referring to (a) of FIG. 4, a display unit in a curved shape may be coupled to a frame in a flat shape. By the coupling with the display unit in the curved shape, the frame may be changed into a curved shape to correspond to the shape of the display unit.

Referring to (b) of FIG. 4, a display unit in a flat shape may be coupled to a frame in a flat shape. An assembly that the display unit and the frame are coupled to each other may be changed into a curved shape by a device (i.e., jig) or a manual operation.

Referring to (c) of FIG. 4, a display unit in a flat shape may be coupled to a frame in a curved shape. By the coupling with the frame in the curved shape, the display unit may be changed into a curved shape to correspond to the shape of the frame.

Referring to (d) of FIG. 4, a display unit in a curved shape may be coupled to a frame in a curved shape. The display unit and the frame may be fabricated in the curved shape from the beginning or fabricated in a flat shape and thereafter changed into the curved shape by the device (i.e., jig) or the manual operation.

The aforementioned structure may facilitate for implementing the curved display unit. Specifically, the structures may be applied to implement the conventional flat LC panel into the curved display unit 151.

An organic light-emitting diode (OLED) may have an advantage in that it can be fabricated by adjusting a curvature of radius in various manners. On the other hand, a liquid crystal display (LCD) which has a relatively great curvature of radius may be easily used in case of less bending. Here, the LCD may preferably be curved within a range in which a curved degree has the least influence in image quality.

In such a manner, comparing with the case of implementing the curved display unit using the OLED, the case of implementing the curved display unit using the LCD has an advantage in view of fabricating the curved display unit with lower costs.

Of course, the curved display unit disclosed herein may be implemented using the OLED, instead of the LCD.

Hereinafter, the structure of implementing the curved display unit 151 will be described in more detail. The following embodiment, as illustrated in (c) of FIG. 4, exemplarily illustrates that a display unit in a flat shape is coupled to a frame in a curved shape to be changed into a curved shape. However, the present disclosure may not be limited to this. That is, a technology of implementing a curved display unit to be explained later may also be applied to the other structures of implementing the curved display unit, which have been previously illustrated.

Also, a frame to which the display unit 151 is mounted may not be limited to the front case 101 which is to be explained hereinafter. The frame may also be a structure separate from the front case 101.

Figure 5:
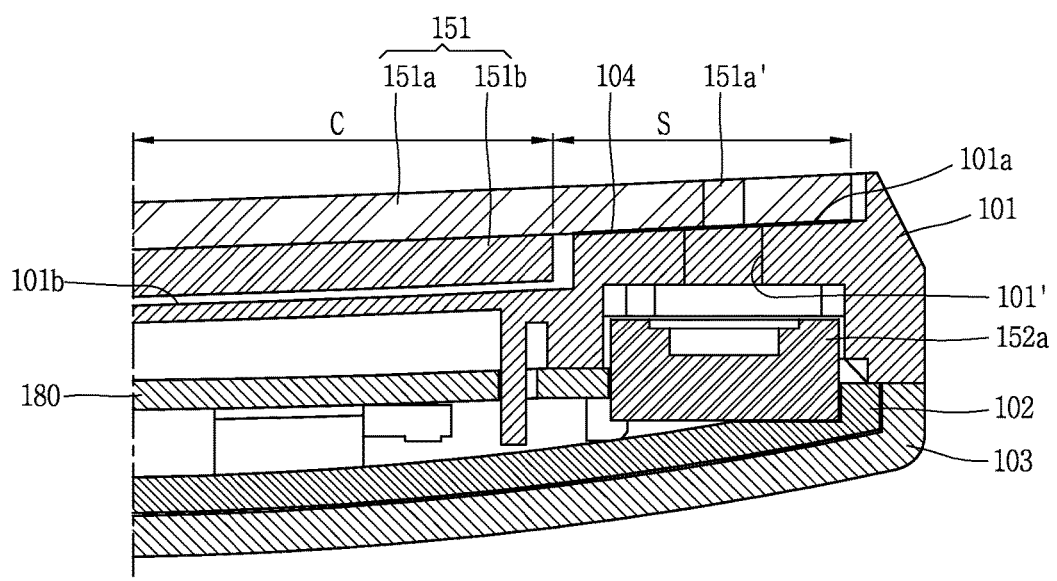
FIG. 5 is a sectional view taken along the line A-A of FIG. 2.

FIG. 5 is a sectional view taken along the line A-A of FIG. 2.

As illustrated in FIG. 5, the display unit 151 may be provided on a front surface of the terminal body to output visual information. Referring to FIG. 5, the window 151a may be mounted on the front case 101 so as to form the front surface of the mobile terminal 100 together with the front case 101.

The front case 101 may be provided with a window mounting portion 101a on which the window 151a is mounted and to which at least part of the window 151a is coupled. The window mounting portion 101a may be configured to support the edge region S of the window 151a, and be formed in a loop shape to surround the display 151b.

FIG. 5 illustrates that the window mounting portion 101a is provided on an upper end portion of the mobile terminal 100. Referring to FIG. 5, a guide hole 101' which guides sounds output from the first audio output module 152a may be formed through the window mounting portion 101a, such that the sounds can be externally emitted through an audio hole 151a' of the window 151a.

A mounting surface of the window mounting portion 101a, to which the window 151a is coupled, may be formed in a curved shape so as to generate a bending force (or a curving force), by which the window 151a is curved. That is, when the window 151a is mounted onto the mounting surface, the bending force may be applied to the window 151a such that the window 151a can be curved to correspond to the curved mounting surface.

Referring back to FIG. 2, the window mounting portion 101a may include a first mounting surface 101a' and a second mounting surface 101a" which correspond to both end portions of the window 151a in a lengthwise direction L of the window 151a. The first mounting surface 101a' and the second mounting surface 101a" may be disposed at both sides with interposing the display 151b therebetween, and be surrounded by the edge region S of the window 151a.

The window mounting portion 101a may further include side mounting surfaces at both sides of the window 151a along a widthwise direction (W) of the window 151a. The side mounting surfaces may be configured to connect the first mounting surface 101a' and the second mounting surface 101a" at left and right sides, respectively. With the configuration, the window mounting portion 101a may be formed in a loop shape, so as to support edges of a rear surface of the window 151a.

The first mounting surface 101a' and the second mounting surface 101a" may have the same curvature of radius. Accordingly, when the window 151a is coupled to the window mounting portion 101a, the window 151a may be changed into a curved shape to correspond to the curvature of radius of the first and second mounting surfaces 101a' and 101a", so as to have a predetermined curvature of radius. Consequently, the curvature of radius of the window 151a may be adjustable by adjusting the curvature of radius of the first and second mounting surfaces 101a' and 101a".

Also, the side mounting surfaces may have a curved shape with the same curvature of radius as those of the first and second mounting surfaces 101a' and 101a".

The window 151a may be separated from the window mounting portion 101a by a restoring force because it is fabricated in a shape of a flat plate. In order for the window 151a to be maintained in the curved shape while being coupled to the first and second mounting surfaces 101a' and 101a", bonding layers 104 may be provided between the window 151a and the first mounting surface 101a' and between the window 151a and the second mounting surface 101a". The bonding layer 104 may be an adhesive, such as optical clear adhesive (OCA) or optical clear resin (OCR), or a bonding tape. The bonding layer 104 may be affected by a tensile force, which is applied in a direction that the window 151a is separated from the window mounting portion 101a.

In addition, the bonding layers 104 may further be provided on the side mounting surfaces, respectively, to increase a coupling force (or bonding force) between the window 151a and the window mounting portion 101a. Here, the bonding layer 104 may have a loop shape. As one example, when the bonding layer 104 is an adhesive tape, the adhesive tape may have a loop shape corresponding to the edges of the rear surface of the window 151a.

The bonding layer 104 may be more firmly coupled to a synthetic resin material than to a metallic material. Therefore, the first and second mounting surfaces 101a' and 101a" may be formed of synthetic resin, taking into account the characteristic of the bonding layer 104. Also, when the first and second mounting surfaces 101a' and 101a" are formed of the synthetic resin, a degradation of a radio performance of an antenna (not illustrated) which is disposed on a rear surface of the first and second mounting surfaces 101a' and 101a" may be minimized.

The side mounting surfaces may also be made of synthetic resin so as to be easily bonded to the bonding layers 104.

Meanwhile, the display 151b may be attached onto the rear surface of the window 151a to be curved, in response to the window 151a being curved. Here, the display 151b may be a liquid crystal display (LCD) which is curved by an external force. Hereinafter, the display 151b is referred to as the LCD 151b.

The curvature of radius of the front surface of the LCD 151b may be the same as that of the rear surface of the window 151a. This may result in minimization of distortion of visual information which is output through the display 151b.

The front case 101 may further include a display mounting portion 101b in which the LCD 151b is accommodated. The display mounting portion 101b may extend from the window mounting portion 101a to cover the rear surface of the LCD 151b.

As illustrated in FIG. 5, the display mounting portion 101b may be formed in the curved shape to correspond to the LCD 151b which is curved in response to the window 151a being curved. The curvature of radius of the display mounting portion 101b may depend on the curvature of radius of the LCD 151b. The curvature of radius of the display mounting portion 101b may be the same or greater than that of the LCD 151b, such that an edge region of the LCD 151b can be prevented from being damaged due to being brought into contact with the display mounting portion 101b.

Unlike this, the display mounting portion 101b may be formed in a flat shape. Since the LCD 151b is formed in the curved shape, a central portion of the curved LCD 151b may be disposed adjacent to the display mounting portion 101b more than both end portions thereof. To prevent the central portion of the curved LCD 151b from being damaged due to being brought into contact with the display mounting portion 101b upon an external impact applied thereto, an impact absorbing pad may be provided between the central portion of the LCD 151b and the display mounting portion 101b.

Although not illustrated, the rear surface of the display mounting portion 101b may form a bottom surface on which the battery 191 is disposed. Here, the rear surface of the display mounting portion 101b may be formed in a flat or curved shape to correspond to the shape of the battery 191.

Meanwhile, unlike the example in which the front case 101 and the rear case 102 define an inner space for accommodating various electronic components, the mobile terminal 100 may also be configured such that one case defines the inner space. Here, the mobile terminal 100 may be implemented to have a uni-body that synthetic resin or metal extends from side surfaces to a rear surface.

According to the present disclosure having the configuration, a mounting surface of a mounting portion to which the window 151a is coupled may be formed in a curved shape, such that the window 151a can be changed into a curved shape to correspond to the mounting surface when the window 151a is mounted on the mounting surface. Therefore, the conventional flat display unit 151 may be easily implemented into a curved display unit in a manner of being coupled to the front case 101, and the curved display unit 151 having various curvatures can be easily realized by adjusting the curvature of radius of the mounting surface.

In the meantime, as aforementioned, the present invention provides new mechanisms for ensuring reliability of image quality in case of implementing the curved display unit 151 using the conventional LCD.

As one of those new mechanisms, the present invention may provide a mechanism for preventing light leakage from an end portion of a curved display unit. Hereinafter, the mechanism will be described in more detail with reference to FIGS. 6 and 7.

Figure 6:
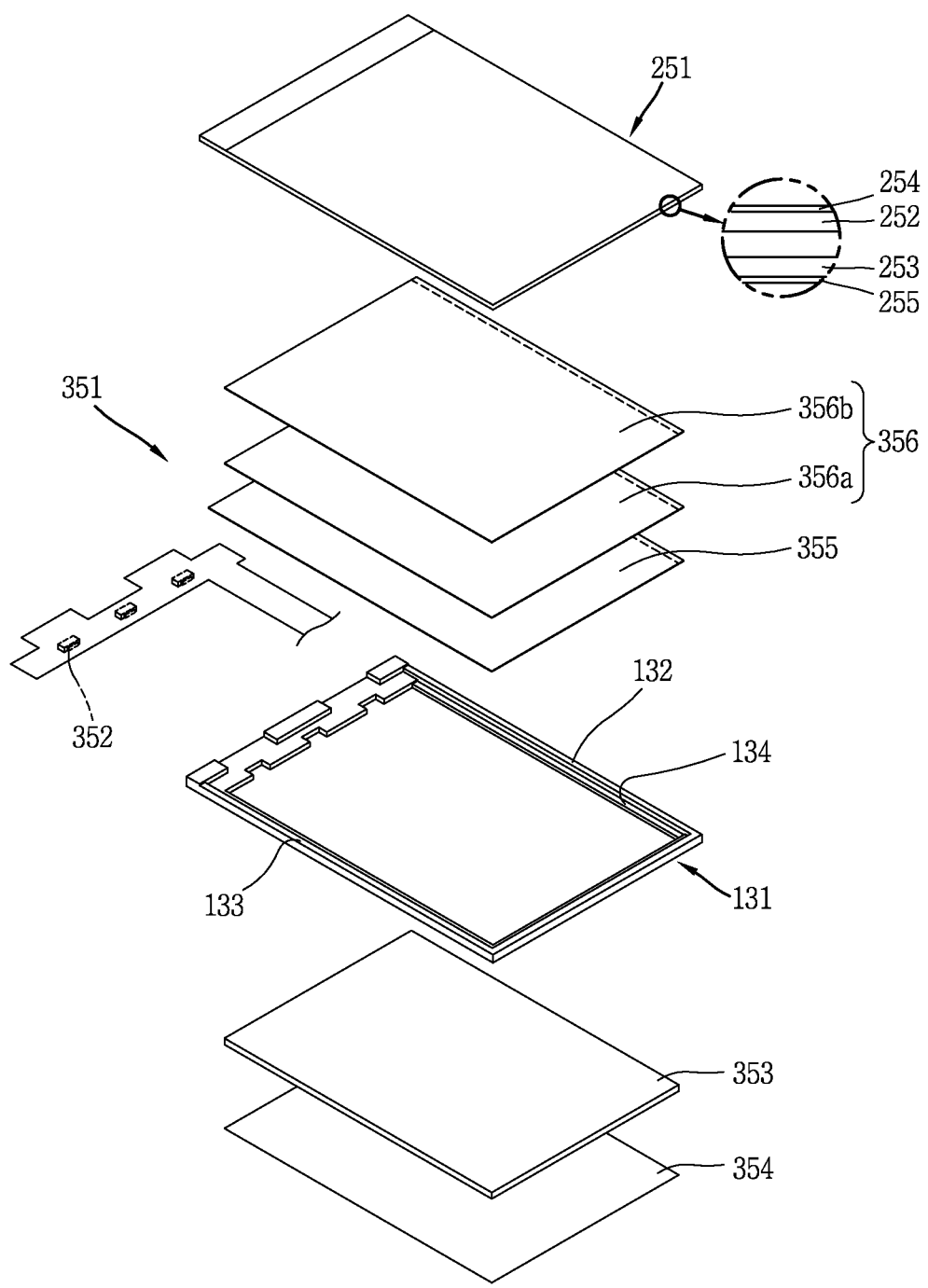
FIG. 6 is an exploded perspective view of a liquid crystal display (LCD) of FIG. 5.
Figure 7:
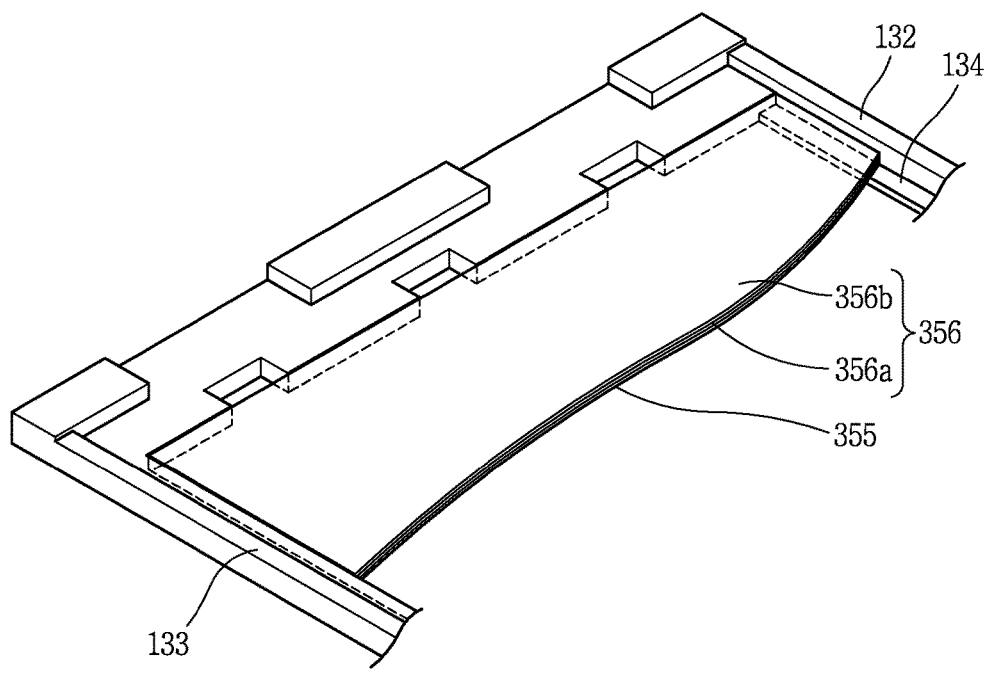
FIG. 7 is an enlarged view illustrating a case where a prism sheet is mounted on a supporting member of FIG. 6.
Figure 8:
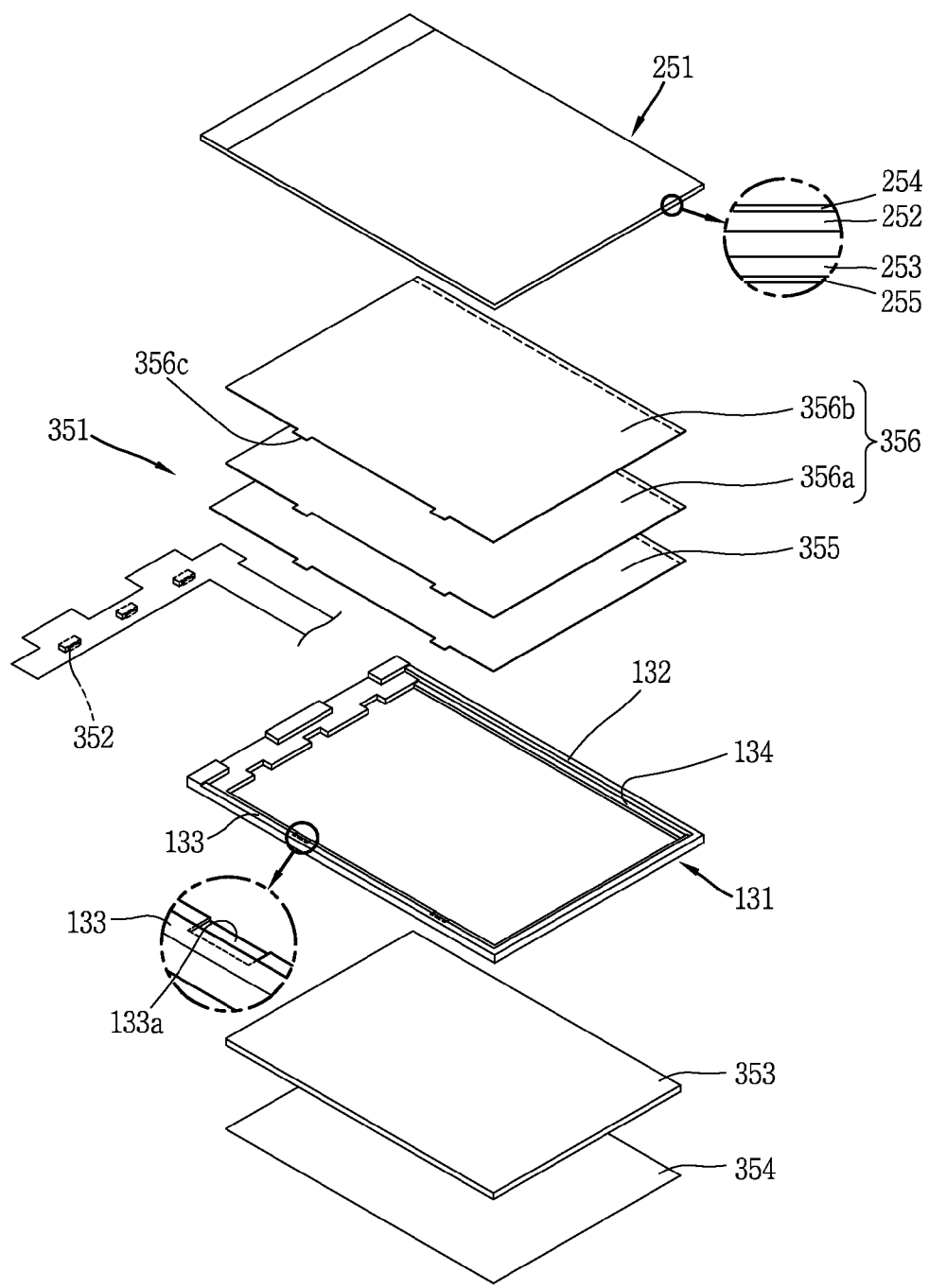
FIG. 8 is an exploded perspective view illustrating a variation of FIG. 6.

FIG. 6 is an exploded perspective view of a curved LCD of FIG. 5, FIG. 7 is an enlarged view illustrating a case where a prism sheet is mounted on a supporting member of FIG. 6, and FIG. 8 is an exploded perspective view illustrating a variation of FIG. 6.

As illustrated in FIG. 6, the LCD 151b may include a liquid crystal panel 251 on which an image is output, and a backlight unit 351 that emits light toward the liquid crystal panel 251.

The LCD 151b may include a color filter (CF) glass 252 and a thin film transistor (TFT) glass 253, which are spaced apart from each other, a liquid crystal filled between the CF glass 252 and the TFT glass 253, a polarizer 254 disposed on an upper surface of the CF glass 252, and another polarizer 255 disposed on a rear surface of the TFT glass 253.

The backlight unit 351 may include a light source 352, a light guide plate 353 guiding light emitted from the light source 352, a reflection film 354 disposed on a rear surface of the light guide plate 353, and a diffusion film 355 and at least one prism sheet 356 laminated on the light guide plate 353. The liquid crystal panel 251 may generate an image using light guided by the light guide plate 353.

In this instance, the diffusion sheet 355 is configured to diffuse light guided by the light guide plate 353. In more detail, the diffusion sheet 355 may scatter light which is discharged from a surface of the light guide plate 353 in a predetermined direction to be evenly diffused over the surface of the light guide plate 353.

The at least one prism sheet 356 may be located between the light guide plate 353 and the liquid crystal panel 251. In more detail, the at least one prism sheet 356 may be located between the diffusion sheet 355 and the TFT glass 253.

The at least one prism sheet 356 collects (condenses) light which is scattered after being discharged from the light guide plate 353 according to a prism principle. More specifically, the at least one prism sheet 356 may play a role of refracting and condensing light transmitted through the diffusion sheet 355 so as to increase luminance.

A bonding layer (not illustrated) may be provided between the liquid crystal panel 251 and the backlight unit 351 for bonding them onto each other. The bonding layer may be made of optical clear adhesive (OCA), optical clear resin (OCR), and the like.

The display unit 151 may be interlayered or integrally formed with a touch sensor, to implement a touch screen. The touch screen may provide an input interface as well as an output interface between the mobile terminal 100 and a user.

As illustrated, the light guide plate 353, the diffusion sheet 355 and the at least one prism sheet 356 may be accommodated in a supporting member 131. The supporting member 131 may be configured to support the liquid crystal panel 251.

The supporting member 131 may be formed in a shape of a curved plate and coupled to a rear surface of the backlight unit 351. In this instance, the backlight unit 351 coupled to the supporting member 131 may be curved to correspond to the curved shape of the supporting member 131, and the liquid crystal panel 251 coupled to the backlight unit 351 may also be changed into a curved shape to correspond to the curved backlight unit 351.

Meanwhile, a bottom surface of the supporting member 131 may be formed smooth to prevent local stress concentration from being caused on the backlight unit 351 to which it is mounted. Also, a bonding member (not illustrated) may be formed of an elastically-deformable material, so as to elastically fill an uneven portion of the bottom surface.

Here, sidewalls protruding from the bottom surface of the supporting member 131 prevent light emitted from the backlight unit 351 from being leaked in a side direction. The supporting member 131 may be formed of a synthetic resin material in a white-based color to reflect light, or formed of a metal with a white film attached onto an inner surface thereof. For example, the sidewalls include first and second mounting portions 132 and 133 on which the liquid crystal panel 251 is mounted. The first and second mounting portions 132 and 133 may be formed on both sides with long lengths of four sides of the supporting member 131.

Referring to FIG. 7, in order to prevent the at least one prism sheet 356 from being shifted due to the LCD 151b being curved, at least one of the first and second mounting portions 132 and 133 may be provided with a recess portion 134 in which an edge portion of the prism sheet 356 is inserted.

The recess portion 134 may be formed merely on one of the first and second mounting portions 132 and 133. However, the present invention may not be limited to this, and the recess portion 134 may also be formed on each of the first and second mounting portions 132 and 133.

The recess portion 134, for example, may be formed in a shape concavely recessed from one surface of the first mounting portion 132 in a thickness direction of the LCD 151b. Here, the recess portion 134 may have an opening toward an inner side of the supporting member 131. An edge region of the prism sheet 356 may be inserted into the recess portion 134 through the opening.

The recess portion 134 also extends in a direction parallel to both sides of the supporting member 131. Meanwhile, in order for the edge region of the at least one prism sheet 356 to be fully inserted into the recess portion 134, the edge region of the at least one prism sheet 356 may be entirely formed linear. For example, one side of the at least one prism sheet 356 is linearly formed, and at least one of edges of the at least one prism sheet 356 is inserted into the recess portion 134. In this instance, since the recess portion 134 is formed long in one direction, edges located at a starting point and an end point of one linearly-formed side may be all inserted into the recess portion 134.

More specifically, the at least one prism sheet 356 may be one of first and second prism sheets 356a and 356b which are overlaid on each other. As illustrated, the first prism sheet 356a may be a sheet interposed between the light guide plate 353 and the second prism sheet 356b. As illustrated in this example, in the structure that the diffusion sheet 355 covers the light guide plate 353, the first prism sheet 356a may be located between the second prism sheet 356b and the diffusion sheet 355. That is, the diffusion sheet 355 which diffuses light discharged from the light guide plate 353 is located between the light guide plate 353 and the first prism sheet 356a.

In this instance, the first prism sheet 356a may have one side inserted into the recess portion 134, and the second prism sheet 356b may have a specific portion, not an entire portion, stopped at the supporting member 131. In other words, the prism sheet 356 may include the first and second prism sheets 356a and 356b overlaid on each other, and the first prism sheet 356a which is located at a lower side of the LCD 151b in the thickness direction of the LCD 151b may have at least a part inserted into the recess portion 134.

Since the LCD 151b is deformed by a bending force in a bending direction, a deformation degree of the LCD 151b may vary along the thickness direction. Here, since the deformation degree increases as getting farther away from a neutral axis of the LCD 151b, bending stress which is applied to a position of the first prism sheet 356a increases more than that applied to a position of the second prism sheet 356b. For the same reason, when the prism sheet is shifted, a displacement of the first prism sheet 356a more increases than that of the second prism sheet 356b. Therefore, this example illustrates that the at least part of the first prism sheet 356a is inserted and stopped in the recess portion 134.

However, the present invention may not be limited to this. The second prism sheet 356b, similar to the first prism sheet 356a, may also have one side inserted into the recess portion 134. In such a manner, when the first and second prism sheets 356a and 356b have the same structure, it may provide an advantageous effect in view of productivity. Hereinafter, the embodiment disclosed herein illustrates a structure that the second prism sheet 356b has the same shape and size as the first prism sheet 356a such that edge portions of the first and second prism sheets 356a and 356b are all inserted into the recess portion 134.

In such a manner, in this embodiment, the recess portion 134 is merely formed on the first mounting portion 132 and only one side of each of the first and second prism sheets 356a and 356b is inserted into the recess portion 134. Here, in order for the first and second prism sheets 356a and 356b to be mounted on the supporting member 131 without an inclination, one surface of the light guide plate 353 may be flush with a bottom of the recess portion 134.

Here, the other side (an opposite side to the one side) of the prism sheet 356a, 356b may entirely be formed linear, and accommodated in the supporting member 131. Therefore, the first and second prism sheets 356a and 356b may be accommodated in the supporting member 131 in a manner that central lines thereof are eccentric to a central line of a region between the first and second mounting portions 132 and 133 in one direction.

With the structure that the one side of each of the prism sheets 356*a* and 356*b* is fully inserted into the recess portion 134 of the supporting member 131, the shift of the prism sheet can be prevented even though the LCD is curved or bent.

Also, the aforementioned structure may be changed into various shapes. As one example, referring to FIG. 8, protrusions 356*c* may be formed at the other side of each of the prism sheets 356*a* and 356*b*, and insertion recesses 133*a* in which the protrusions 356*c* are inserted may be formed at the second mounting portion 133.

In this manner, the shift of the prism sheet may be prevented by the structure that the one side of the prism sheet is entirely inserted into the recess portion 134 of the first mounting portion 132, and the assembling process of the prism sheet may be facilitated by virtue of the structure that the other side is partially inserted into the insertion recesses of the second mounting portion 133 by way of using the protrusions formed on the other side.

Also, the mobile terminal according to the present invention may be provided with a mechanism for preventing a displacement of a diffusion sheet when the LCD is curved. Hereinafter, the mechanism will be described. In addition, the same/like components as the foregoing embodiment will be provided with the same/like reference numerals in the following embodiments. Repetitive description thereof will thusly be omitted.

Figure 9:
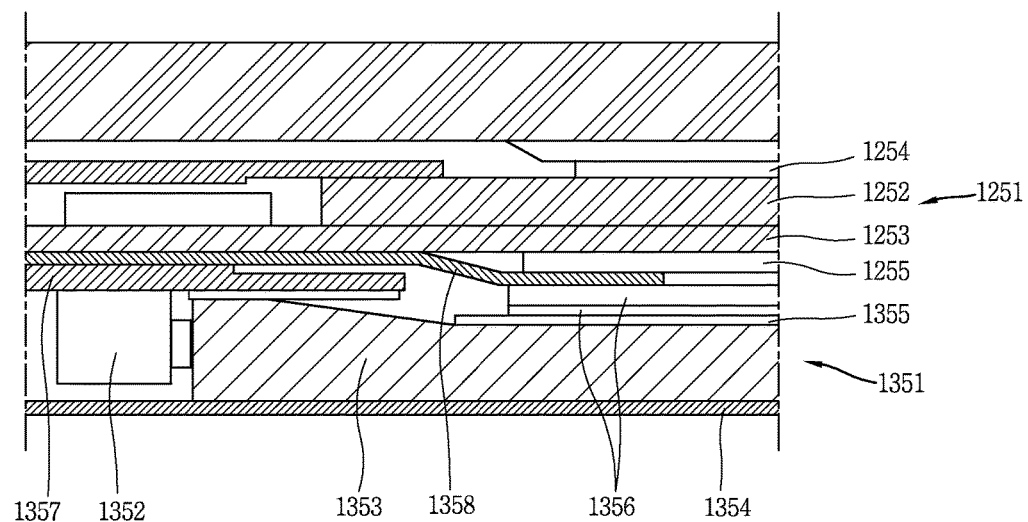
FIG. 9 is a sectional view illustrating another example of an LCD in accordance with the present invention.
Figure 10:
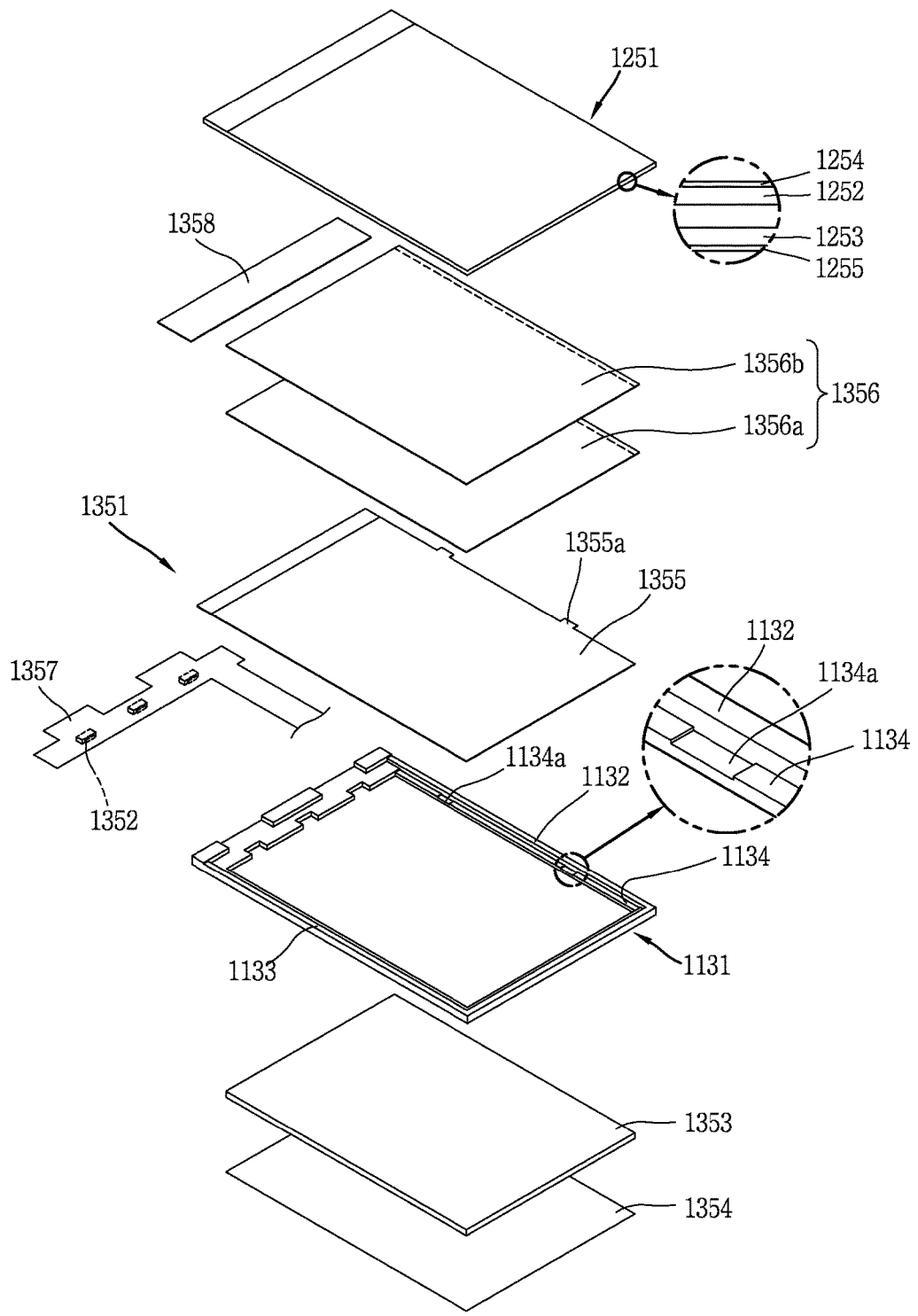
FIG. 10 is an exploded perspective view of the LCD of FIG. 9.

FIG. 9 is a sectional view illustrating another example of an LCD in accordance with the present invention, and FIG. 10 is an exploded perspective view of the LCD of FIG. 9.

As illustrated in FIGS. 9 and 10, an LCD may include a liquid crystal panel 1251 on which an image is output, a backlight unit 1351 that emits light toward the liquid crystal panel 1251.

The liquid crystal panel 1251 may include a color filter (CF) glass 1252 and a thin film transistor (TFT) glass 1253, which are spaced apart from each other, a liquid crystal filled between the CF glass 1252 and the TFT glass 1253, a polarizer 1254 disposed on an upper surface of the CF glass 1252, and another polarizer 1255 disposed on a rear surface of the TFT glass 1253.

The backlight unit 1351 may include a light source 1352, a light guide plate 1353 guiding light emitted from the light source 1352, a reflection film 1354 disposed on a rear surface of the light guide plate 1353, and a diffusion film 1355 and at least one prism sheet 1356 laminated on the light guide plate 1353. Also, the light guide plate 1353, the reflection film 1354, the diffusion sheet 1355 and the prism sheet 1356 may be mounted on a supporting member 1131.

Components of the liquid crystal panel 1251 and the backlight unit 1351 according to this embodiment may employ the structure of the LCD described with reference to FIGS. 6 to 8, and the applied structure will be understood by the description of FIGS. 6 to 8. Also, the components of the liquid crystal panel 1251 and the backlight unit 1351 of this embodiment will also employ structures of LCDs described in other embodiments to be explained later, except for this embodiment. Description thereof will be given in each embodiment.

The diffusion sheet 1355 is provided between the light guide plate 1353 and the prism sheet 1356 to diffuse light discharged through the light guide plate 1353. Meanwhile, the light source 1352 is provided on a flexible printed circuit board (FPCB) 1357. The FPCB 1357 may be disposed spaced apart (or separated) from one end portion of the prism sheet 1356 in a direction parallel to both sides of the supporting member 1131.

As illustrated, the diffusion sheet 1355 and the FPCB 1357 are spaced apart from each other. Accordingly, the diffusion sheet 1355 and the FPCB 1357 may form a structure that they do not overlap each other in a thickness direction of the LCD.

In more detail, one end portion of the diffusion sheet 1355 may be located between one end portion of the prism sheet 1356 and the FPCB 1357. This may allow an exposed portion of the light guide plate 1353 to be located between the diffusion sheet 1355 and the FPCB 1357.

In this instance, the exposed portion is obscured by a light shielding tape 1358 which is attached onto the supporting member 1131. The light shielding tape 1358 may be attached onto the supporting member 1131 to prevent light emitted from the backlight unit from being leaked through an end portion of the display unit.

More specifically, the light shielding tape 1358 may be attached onto each of the FPCB 1358 and the prism sheet 1356 to cover the FPCB 1357 and the prism sheet 1356.

If the diffusion sheet 1355 and the FPCB 1357 are attached to each other, when the LCD is curved, since one side of the diffusion sheet is fixed, the other side thereof may be shifted. Therefore, this embodiment illustrates that the diffusion sheet 1355 and the FPCB 1357 are separated from each other so as to prevent the displacement of the diffusion sheet 1355. Here, the exposure of the light guide plate 1353 due to the separation may be covered with the light shielding tape 1358 so as to prevent the light leakage.

Here, at least a part of the light shielding tape 1358 may be formed to overlap a recess portion 1134 of the supporting member 1131. For example, the light shielding tape 1358 may be configured to cover one edge (side) of the prism sheet 1356 inserted into the recess portion 1134. This structure can prevent the light leakage from the backlight unit.

As illustrated, the diffusion sheet 1355 may be formed longer than the prism sheet 1356. More specifically, an end portion of the diffusion sheet 1355 which is close to the light source 1352 may more protrude toward the light source 1352 than a corresponding end portion of the prism sheet 1356. In such a manner, as the diffusion sheet 1355 has a different size from the prism sheet 1356, a fixing structure of the diffusion sheet 1355 may differ from a fixing structure of the prism sheet 1356.

For example, stopping grooves 1134*a* may be formed on the recess portion 1134 and stopping protrusions 1355*a* stopped in the stopping grooves 1134*a* may be formed at an edge of the diffusion sheet 1355. The stopping grooves 1134*a* may be concavely recessed from a bottom of the recess portion 1134 in a thickness direction of the LCD, and located approximately at a middle region of the recess portion 1134 along a lengthwise direction of the recess portion 1134. The stopping protrusions 1355*a* may be provided on the diffusion sheet 1355 at positions corresponding to the stopping grooves 1134*a* and inserted into the stopping grooves 1134*a*. With the structure, the diffusion sheet 1355 may be configured such that fixed points thereof cannot be prevented from being inclined to one of both ends of the supporting member 1131.

Also, the mobile terminal according to the present invention may be provided with a mechanism for attenuating (reducing) or preventing light leakage or loosing of a light shielding tape. Hereinafter, the mechanism will be described with reference to the related drawings.

Figure 11:
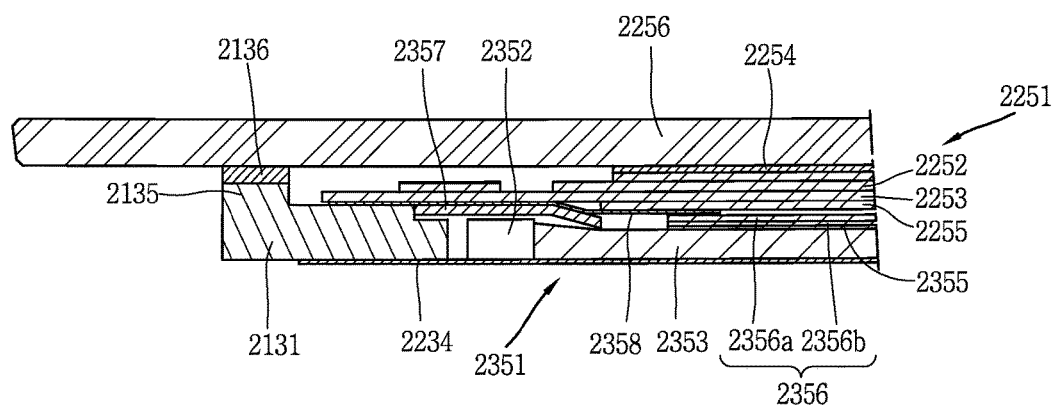
FIGS. 11 and 12 are sectional views illustrating another example of an LCD in accordance with the present invention.
Figure 12:
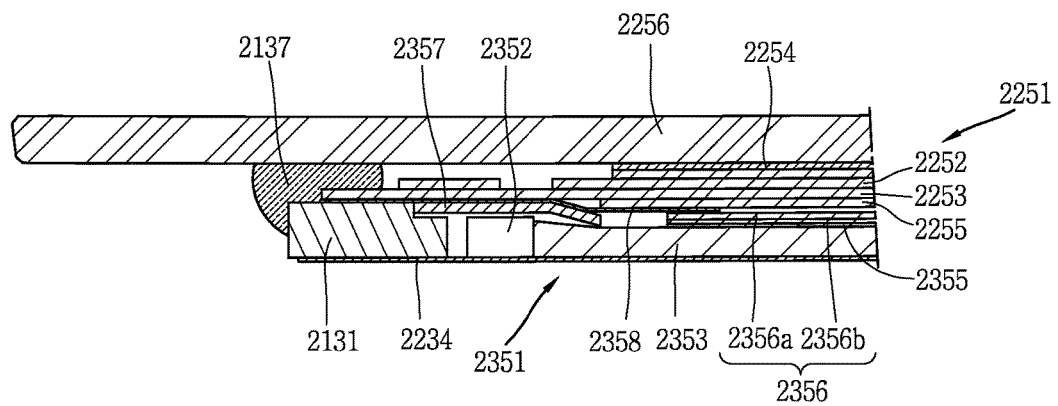

FIGS. 11 and 12 are sectional views illustrating another example of an LCD in accordance with the present invention.

As illustrated in FIGS. 11 and 12, an LCD may include a liquid crystal panel 2251 on which an image is output, a backlight unit 2351 that emits light toward the liquid crystal panel 2251.

The liquid crystal panel 2251 may include a color filter (CF) glass 2252 and a thin film transistor (TFT) glass 2253, which are spaced apart from each other, a liquid crystal filled between the CF glass 2252 and the TFT glass 2253, a polarizer 2254 disposed on an upper surface of the CF glass 2252, and another polarizer 2255 disposed on a rear surface of the TFT glass 2253. Also, the LCD may include a cover glass 2256 that covers the liquid crystal panel 2251. The cover glass 2256 may cover the light guide plate 2254 located on an upper surface of the CF glass 2252. In this instance, an optical film (OCR film) may be disposed between the light guide plate 2254 and the cove glass 2256. Also, the cover glass 2256 may correspond to the window 151a of the aforementioned display unit 151. Here, the cover glass 2256 may be disposed on the front case 101 (see FIG. 2) so as to define the front surface of the terminal main body along with the front case 101.

The backlight unit 2351 may include a light source 2352, a light guide plate 2353 guiding light emitted from the light source 2352, a reflection film 2354 disposed on a rear surface of the light guide plate 2353, and a diffusion film 2355 and at least one prism sheet 2356 laminated on the light guide plate 2353. Also, the light guide plate 2353, the reflection film 2354, the diffusion sheet 2355 and the prism sheet 2356 may be mounted on a supporting member 2131.

Components of the liquid crystal panel 2251 and the backlight unit 2351 according to this embodiment may employ the structure of the LCD described with reference to FIGS. 6 to 10, and the applied structure will be understood by the description of FIGS. 6 to 10. Also, the components of the liquid crystal panel 2251 and the backlight unit 2351 of this embodiment will also employ structures of LCDs described in other embodiments to be explained later, except for this embodiment. Description thereof will be given in each embodiment.

As illustrated in FIGS. 11 and 12, the supporting member 2131 may have at least a part attached to the cover glass 2256.

In more detail, as illustrated in FIG. 11, a protrusion 2135 which protrudes toward the cover glass 2256 may be formed on at least one end portion of the supporting member 2131. The protrusion 2135 and a rear surface of the cover glass 2256 may be adhered to each other. In this instance, the protrusion 2135 may protrude from each of both ends of the supporting member 2131. An adhesive pad 2136 may be disposed on the protrusion 2135 such that the protrusion 2135 can be adhered onto the rear surface of the cover glass 2256.

As another example, referring to FIG. 12, an adhesive 2137 may be coated on both ends of the supporting member 2131, without a protrusion, so as to be filled in a gap between the rear surface of the cover glass 2256 and the supporting member 2131, thereby coupling the supporting member 2131 and the cover glass 2256 to each other.

In this manner, both ends of the backlight unit 2351 may be adhered onto the cover glass 2256, so as to prevent a light shielding tape 2358 from being exfoliated due to an attached portion of the light shielding tape 2358 being pulled out by a restoring force of the backlight unit 2351 when the LCD is curved. Here, when the light guide plate 2358 is exfoliated, a FPCB 2357 with the light source mounted thereto may get loosed. However, the mechanism according to this embodiment can attenuate or prevent the loosing.

In addition, the present invention may provide a mechanism for attenuating or preventing light leakage caused due to torsion of a rubbing shaft. Hereinafter, this mechanism will be described in detail with the related drawings.

Figure 13:
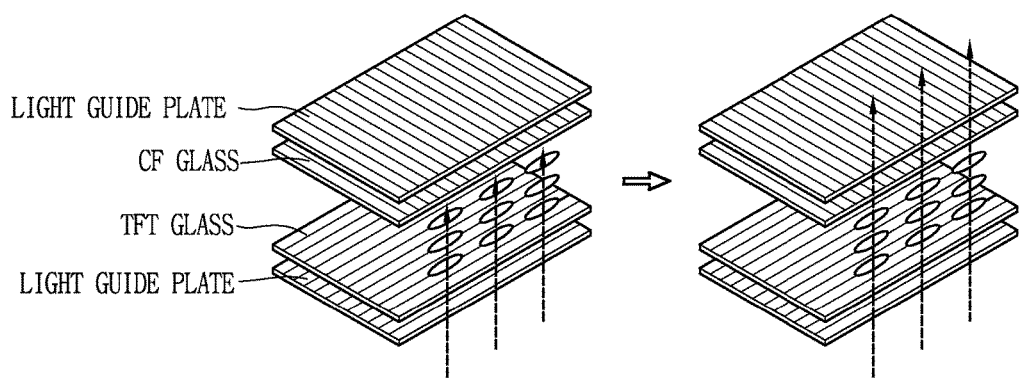
FIG. 13 is a conceptual view illustrating a generation of light leakage due to torsion of a rubbing shaft.
Figure 14:
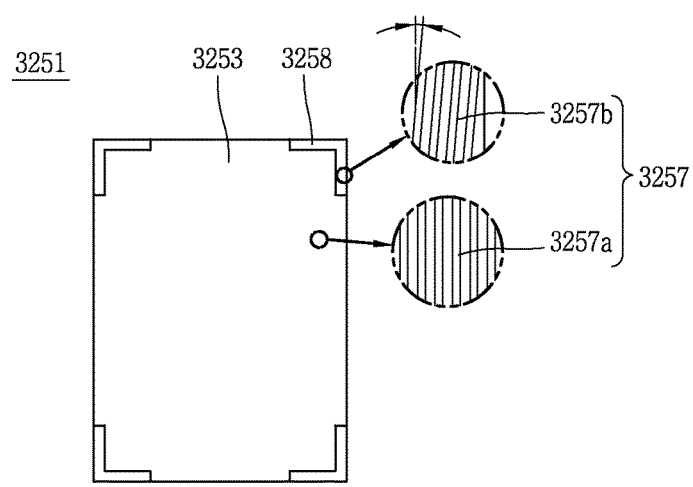
FIG. 14 is a planar view of a thin film transistor (TFT) glass illustrating a conception of dividing regions of grooves in which liquid crystals are disposed.

FIG. 13 is a conceptual view illustrating a generation of light leakage due to torsion of a rubbing shaft, and FIG. 14 is a planar view of a thin film transistor (TFT) glass illustrating a conception of dividing regions of grooves in which liquid crystals are disposed.

As illustrated in FIGS. 13 and 14, a TFT glass 3253 is provided with recesses 3257 in which liquid crystal of a liquid crystal panel 3251 is filled. The recesses 3257 may be formed through a rubbing process of rubbing the TFT glass 3253 using a rubbing roll. Therefore, the recesses 3257 may be referred to as rubbing recesses.

Meanwhile, other components of the liquid crystal panel 3251 or components of a backlight unit disposed at a rear surface of the liquid crystal panel 3251 may employ the structures of the backlight units described with reference to FIGS. 6 to 12 and description thereof will be omitted. Also, other components of the liquid crystal panel 3251 or the components of the backlight unit disposed at the rear surface of the liquid crystal panel 3251 may employ structures of LCDs described in other embodiments to be explained later, except for this embodiment, and description thereof will be omitted.

As illustrated in the first drawing of FIG. 13, rubbing recesses are formed in parallel to one direction of the TFT glass. In this instance, the one direction may be in parallel to both sides of the TFT glass. A CF glass and a light guide plate disposed on an upper surface of the CF glass are disposed perpendicular to the one direction to correspond to the rubbing recesses.

When the LCD is curved, torsion may be caused at corner portions of the TFT glass. The torsion may be caused because external forces for bending the LCD are also applied in other directions, in addition to the bending direction, during a fabricating process. Therefore, as illustrated in the second drawing of FIG. 13, torsion stress may be generated at corners or both ends of the TFT glass or the CF glass, and thereby a rubbing shaft is distorted, thereby causing light leakage on a black screen.

Due to the distorted rubbing shaft, liquid crystal may be leaked out of the rubbing recesses, thereby failing to represent a preset color. In addition, as bending strength increases, both upper and lower ends or both left and right sides of the liquid crystal panel may suffer from a decrease in contrast and an increase in luminance of a black color, rather than a center thereof.

Still referring to FIGS. 13 and 14, to reduce or prevent degradation of optical performance due to the torsion in this embodiment, the recesses 3257 may be formed at different angles according to a preset region. The recesses 3257 may include a first recess 3257a formed in a first direction, and a second recess 3257b formed in a second direction which intersects with the first direction. In this instance, the second direction may intersect with the first direction by an angle of 1 to 5°. For example, when the first direction is in parallel to both sides of the TFT glass 3253 and formed at an angle of 45° from a reference line, the second direction may be formed at an angle of 48° from the reference line.

Also, the second recess 3257b is located on at least one edge portion of the liquid crystal panel. In more detail, the second recess 3257b may be formed on each edge portion of the TFT glass 3253 and the first recess 3257a may be formed on a portion except for the edge portion. The edge portion on which the second recess 3257b is located may be defined as a specific region 3258. The specific region 3258 may be a region extending from the edge of the TFT glass 3253 in horizontal and vertical directions by preset distances.

Meanwhile, the present invention provides a mechanism for uniformly maintaining a gap of a liquid crystal panel by setting different deformation degrees for spacers disposed between the CF glass and the TFT glass. Hereinafter, this mechanism will be described in more detail with reference to the related drawings.

Figure 15:
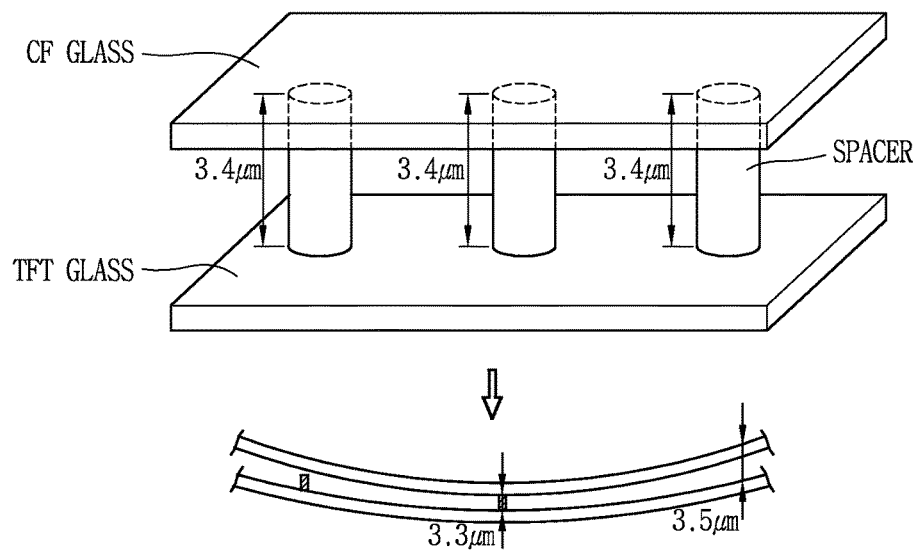
FIG. 15 is a conceptual view illustrating an example that a non-uniform gap is formed on a liquid crystal panel due to an LCD being curved.
Figure 16:
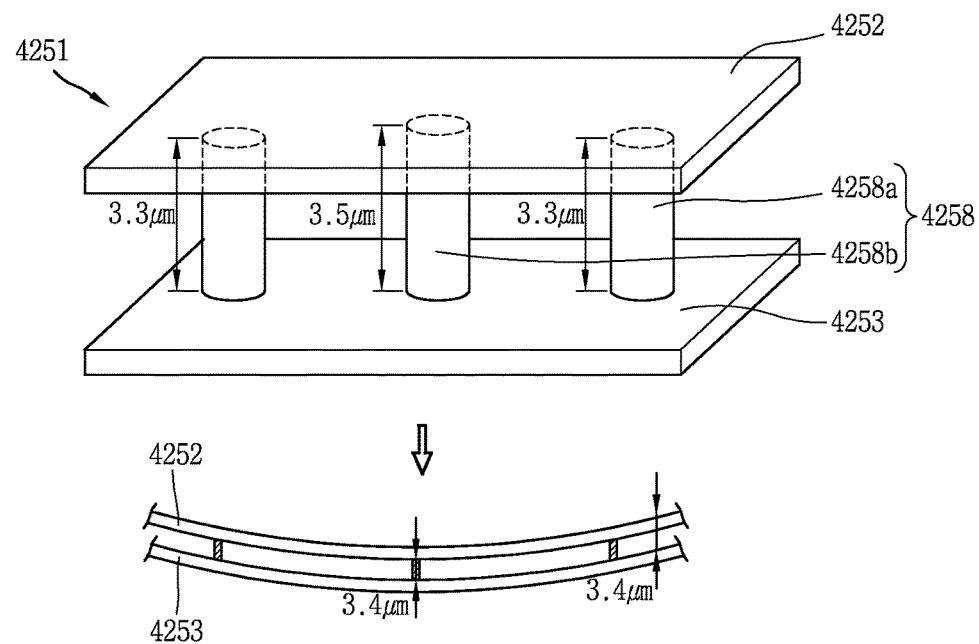
FIG. 16 is a conceptual view illustrating a liquid crystal panel having spacers for uniform gaps of a liquid crystal panel.

FIG. 15 is a conceptual view illustrating an example that a non-uniform gap is formed on a liquid crystal panel due to an LCD being curved, and FIG. 16 is a conceptual view illustrating a liquid crystal panel having spacers for uniform gaps of a liquid crystal panel.

As illustrated in FIGS. 15 and 16, a liquid crystal panel 4251 may include a CF glass 4252 and a TFT glass 4253 spaced apart from each other. Also, the liquid crystal panel 4251 may include spacers 4258 disposed between the CF glass 4252 and the TFT glass 4253.

In the meantime, other components of the liquid crystal panel 4251 or components of a backlight unit disposed at a rear surface of the liquid crystal panel 4251 may employ the structures of the backlight units described with reference to FIGS. 6 to 14 and description thereof will be omitted.

As illustrated in FIG. 15, when the liquid crystal panel is curved, the CF glass and the TFT glass are curved by different degrees because of different distances thereof from a neutral axis. Accordingly, a cell gap between the CF glass and the TFT glass may not be uniformly maintained. Specifically, the cell gaps may increase at four edge portions of the liquid crystal panel, which causes a decrease in contrast and light leakage. Also, the light leakage may result in presence of white lines on the liquid crystal panel and degraded uniformity.

As illustrated in FIG. 16, in this embodiment, to reduce or prevent the cell gaps from being non-uniform, spacers 4258 disposed between the CF glass 4252 and the TFT glass 4253 may be configured to exhibit different deformation degrees with respect to external forces. For example, in the curved LCD, some (e.g., 4258a) of the spacers 4258 may be pressed and others (e.g., 4258b) may be expanded. To arouse this deformation, the spacers 4258 may be formed of a material which is deformable by an external force when the LCD is curved.

In this instance, the some spacers 4258a (hereinafter, referred to as a first spacer) may be disposed between the others 4258b (hereinafter, referred to as a second spacer). That is, the second spacers 4258b may be spacers adjacent to edges or sides, and the first spacers 4258a may be spacers disposed on a center among those edges.

To implement this structure, prior to bending the LCD, the first spacers 4258a may have a length greater than a size of a cell gap after the LCD is curved, and the second spacers 4258b may have a length smaller than a size of a cell gap after the LCD is curved. For example, the size of the cell gap may be 3.4 μm, the first spacer 4258a may be 3.5 μm long and the second spacer 4258b may be 3.3 μm long prior to the LCD being curved. Here, the first spacer 4258a and the second spacer 4258b in the curved LCD may be pressed and expanded by being deformed into about 3.4 μm, respectively. Accordingly, the cell gap after the LCD is curved is uniformly maintained by about 3.4 μm over the region of the liquid crystal panel.

As such, such dual cell gap may be applied during a fabricating process, such that the cell gap can be uniformly maintained when the LCD is curved, thereby preventing lowered contrast and light leakage.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body;
a window disposed on one surface of the terminal main body, the window being curved; and
a liquid crystal display (LCD) disposed on a rear surface of the window and configured to output visual information through the window, the LCD being curved, the LCD including:
a light guide plate;
a liquid crystal panel configured to generate an image using light discharged from the light guide plate;
at least one prism sheet disposed between the light guide plate and the liquid crystal panel;
a supporting member configured to accommodate the light guide plate and the at least one prism sheet therein and to support the liquid crystal panel;
a diffusion sheet for diffusing light discharged from the light guide plate, the diffusion sheet being disposed between the light guide plate and the at least one prism sheet;
a flexible printed circuit board (FPCB); and
a light source of the LCD located on the FPCB,
wherein the FPCB is spaced apart from one end portion of the at least one prism sheet in a horizontal direction, and
wherein the diffusion sheet and the FPCB are separated from each other in the horizontal direction,
wherein the diffusion sheet and the FPCB are configured to cover the light guide plate in a vertical direction,
wherein one end portion of the diffusion sheet is located between the one end portion of the at least one prism sheet and the FPCB to form an exposed portion of the light guide plate between the diffusion sheet and the FPCB,
wherein a light shielding tape is attached onto the FPCB, and the light shielding tape is bent to be attached onto the at least one prism sheet, and
wherein the light shielding tape is configured to cover the FPCB, the exposed portion and the at least one prism sheet in the vertical direction.

2. The mobile terminal of claim 1, wherein the supporting member includes:
first and second mounting portions on which the liquid crystal panel is mounted, at least one of the first and second mounting portions having a recess portion,
wherein an edge portion of the at least one prism sheet is received in the recess portion to prevent a shift of the at least one prism sheet,
wherein the first and second mounting portions are formed on opposed sides of the supporting member, respectively, and wherein the recess portion extends parallel to the opposed sides.

3. The mobile terminal of claim 2, wherein the recess portion is formed on only one of the first and second mounting portions.

4. The mobile terminal of claim 2, wherein the edge portion has a linear edge, the linear edge being received in the recess portion.

5. The mobile terminal of claim 2, wherein the edge portion is an entire edge of the at least one prism sheet, the edge portion being received in the recess portion.

6. The mobile terminal of claim 2, wherein the at least one prism sheet includes a protrusion opposite the edge portion,
the support member includes an insertion recess opposite the recess portion, and
the protrusion is received in the insertion recess.

7. The mobile terminal of claim 2, wherein the diffusion sheet is disposed between the light guide plate and the at least one prism sheet, and an edge of the diffusion sheet is received in the recess portion.

8. The mobile terminal of claim 2, wherein at least a portion of the light shielding tape overlaps the recess portion.

9. The mobile terminal of claim 1, wherein the at least one prism sheet is one of a first and second prism sheets, the first and second prism sheets being overlaid on each other.

10. The mobile terminal of claim 9, wherein the at least one prism sheet is the first prism sheet and the first prism sheet is located between the light guide plate and the second prism sheet.

11. The mobile terminal of claim 10, wherein the second prism sheet has an edge portion inserted into the recessed portion.

12. The mobile terminal of claim 1, wherein the diffusion sheet is disposed not to overlap the FPCB in a thickness direction of the LCD.

13. The mobile terminal of claim 1, wherein the recess portion includes stopping recesses, and
wherein an edge of the diffusion sheet includes stopping protrusions corresponding to the stopping recesses, the stopping protrusions being received in the stopping recesses.

14. The mobile terminal of claim 1, wherein the LCD includes a cover glass covering the liquid crystal panel, and
wherein at least a part of the supporting member is adhered to the cover glass.

15. The mobile terminal of claim 14, wherein the part of the supporting member is one end portion of the supporting member and includes at least one protrusion protruding toward a rear surface of the cover glass such that the at least one protrusion is adhered to the rear surface of the cover glass.

16. The mobile terminal of claim 1, wherein the liquid crystal panel includes recesses filled with liquid crystals, the recesses include a first recess formed in a first direction and a second recess formed in a second direction intersecting with the first direction.

17. The mobile terminal of claim 16, wherein the second recess is located on at least one edge portion of the liquid crystal panel.

18. The mobile terminal of claim 1, wherein the liquid crystal panel includes:
a color filter (CF) glass; and
a thin film transistor (TFT) glass; and
spacers disposed between the CF glass and the TFT glass, the spacers having different deformation degrees due a curvature of the LCD.

19. The mobile terminal of claim 18, wherein some of the spacers are in a pressed state and others of the spacers are in an expanded state.

* * * * *